(12) United States Patent
Ito et al.

(10) Patent No.: US 9,006,673 B2
(45) Date of Patent: Apr. 14, 2015

(54) X-RAY ANALYSIS APPARATUS, X-RAY ANALYSIS SYSTEM, X-RAY ANALYSIS METHOD, AND X-RAY ANALYSIS PROGRAM

(71) Applicant: Rigaku Corporation, Akishima-shi, Tokyo (JP)

(72) Inventors: Kazuki Ito, Akishima (JP); Yoshinori Ueji, Akishima (JP); Koichi Kajiyoshi, Ome (JP); Kunio Nishi, Hachiouji (JP)

(73) Assignee: Rigaku Corporation, Tokyo (JP)

( * ) Notice: Subject to any disclaimer, the term of this patent is extended or adjusted under 35 U.S.C. 154(b) by 180 days.

(21) Appl. No.: 13/905,559

(22) Filed: May 30, 2013

(65) Prior Publication Data
US 2014/0021364 A1 Jan. 23, 2014

(30) Foreign Application Priority Data

Jul. 18, 2012 (JP) ................................. 2012-159863

(51) Int. Cl.
*G01T 1/17* (2006.01)
(52) U.S. Cl.
CPC ........................................ *G01T 1/17* (2013.01)
(58) Field of Classification Search
CPC ......................................................... G01T 1/17
USPC ................. 250/370.09, 371; 378/62
See application file for complete search history.

(56) References Cited

U.S. PATENT DOCUMENTS

| 5,204,944 | A | 4/1993 | Wolberg et al. |
| 5,204,994 | A | 4/1993 | Herzberg et al. |
| 6,242,743 | B1 | 6/2001 | DeVito et al. |

OTHER PUBLICATIONS

Barna et al., "Calibration procedures for charge-coupled device x-ray detectors", Review of Scientific Instruments, vol. 70, No. 7, Jul. 1999, pp. 2927-2934.
Hammersley et al., "Calibration and correction of spatial distortions in 2D detector systems", Nuclear Instruments and Methods in Physics Research, A 346, North-Holland, 1994, pp. 312-321.
Hulsen (Doctoral Thesis ETH No. 16289), The PILATUS 1M Detector, A Novel Large Area Pixel Detector, PSI, Villigen, 2005, (121 pages).

(Continued)

*Primary Examiner* — Mark R Gaworecki
(74) *Attorney, Agent, or Firm* — Birch, Stewart, Kolasch & Birch, LLP

(57) ABSTRACT

An X-ray analysis apparatus converts an X-ray intensity distribution of discrete data determined for each pixel, from a first plane where the distribution is known into a second plane where the distribution is not known. The X-ray analysis apparatus projects onto the second plane, a grid point which specifies a pixel on the first plane and an intermediate point between the grid points, as nodes, calculates an area of a region where a polygon expressing a projected pixel specified by the projected nodes overlaps with each pixel on the second plane, to thereby calculate an occupancy ratio of the polygon expressing the projected pixel to each pixel on the second plane and distributes X-ray intensity in the pixel on the first plane to the pixel on the second plane based on the occupancy ratio, to thereby convert the X-ray intensity distribution.

11 Claims, 15 Drawing Sheets

(56) References Cited

OTHER PUBLICATIONS

Hulsen et al., "Distortion calibration of the PILATUS1M detector", Nuclear Instruments and Methods in Physics Research, A 548, 2005, pp. 540-554.

Ito et al., Correction Method and Software for Image Distortion and Nonuniform Response in Charge-Coupled Device-Based X-ray Detectors Utilizing X-ray Image intensifier, Japanese Journal of Applied Physics, vol. 44, No. 12, 2005, pp. 8684-8691.

Stanton et al., "Correcting Spatial Distortions and Nonuniform Response in Area Detectors", J. Appl. Cryst. 25, (1992), pp. 549-558.

X-RAY ANALYSIS APPARATUS, X-RAY ANALYSIS SYSTEM, X-RAY ANALYSIS METHOD, AND X-RAY ANALYSIS PROGRAM

BACKGROUND OF THE INVENTION

1. Field of the Invention

The present invention relates to an X-ray analysis apparatus, an X-ray analysis system, an X-ray analysis method, and an X-ray analysis program for converting an X-ray intensity distribution of discrete data determined for each pixel, from a first plane where the distribution is known into a second plane where the distribution is not known.

2. Description of the Related Art

While image data is usually two-dimensional, in consideration of an observation or measurement space, the image data can be regarded as data on a three-dimensional orthogonal coordinate system. Furthermore, data measured by a detector takes a discontinuous value for each pixel and is expressed as spatially discrete information as discrete data.

There is a case where such discrete data on an orthogonal coordinate system needs to be mapped to another coordinate system having the same or a lower dimension. Particularly in mapping in which data is expressed discretely in a mapping source and a mapping destination, one-to-one relationship can hold in a special conversion such as square pixel rotation in a multiple number of n/2. However, usually, one-to-one relationship does not hold between data elements even when the conversion operation is parallel transfer or rotation.

In the field of image processing, a method of approximately solving this problem exists for a long time and a nearest neighbor algorithm, a bilinear interpolation method, and a bicubic interpolation method are widely used. However, these methods do not guarantee preservation of a pixel value and an integral value thereof and are not always appropriately applied to an X-ray diffraction or scattering method in which a position and an integral value of a pixel value are important.

As a method of preserving a position and an integral value of a pixel value, there is proposed an approximation method of transforming a square pixel of a mapping source into a rectangular region in a mapping destination (refer to Non-patent Documents 1 to 4). However, in this method, while a pixel value is preserved, there is caused deformation of a high-frequency component of space frequency. Furthermore, a measurement value by a digital detector is limited to an integer, and sometimes an observation coordinate system does not coincide with an ideal observation coordinate system. For example, in the case such as the detector being inclined, data expression is treated only by using an integer value, and thus a rounding error to an integer value can be accumulated.

Non-Patent Document

Non-patent Document 1: M. Stanton et al., J. Appl. Cryst. 25, 549-558 (1992)

Non-patent Document 2: S. Barna et al., Rev. Sci. Instrum. 70, 2927-2934 (1999).

Non-patent Document 3: Q. Huelsen, C. Bronnimann, E. F. and Eikenberry, Nucl. Instrum. Methods A548, 540-554 (2005)

Non-patent Document 4: G. Huelsen, Ph.D thesis (2005)

Non-patent Document 5: K. Ito, H. Kamikubo, N. Yagi and Y. Amemiya, "Calibration method and software for image distortion and non-uniformity in CCD-based X-ray detectors utilizing X-ray image-intensifier", Jpn. J. Appl. Phys. 44, 8684-8691 (2005)

Non-patent Document 6: A. P. Hammersley et al., Nucl. Instrum. Methods A346, 312-321 (1994)

As a solution method for such a problem, there is proposed a method of division into small elements (refer to Non-patent Document 5). However, in this method, calculation explosion occurs (0[N4]) when precision is to be improved. Furthermore, while a method by triangular division is known (Non-patent Document 6), the number of divisions needs to be increased for improving precision and a calculation amount becomes huge.

SUMMARY OF THE INVENTION

The present invention has been achieved in view of such a situation, and aims to provide an X-ray analysis apparatus, an X-ray analysis system, an X-ray analysis method, and an X-ray analysis program, each of which can perform reciprocal conversion while keeping an integral value of an X-ray intensity and can convert an X-ray intensity distribution highly accurately while reducing a calculation amount.

(1) For achieving the above-described object, an X-ray analysis apparatus of the present invention is an X-ray analysis apparatus converting an X-ray intensity distribution of discrete data determined for each pixel, from a first plane where the distribution is known into a second plane where the distribution is not known, and includes: a projection section projecting, onto the second plane, a grid point which specifies a pixel on the first plane and an intermediate point between the grid points, as nodes; an occupancy ratio calculation section calculating an area of a region where a polygon expressing a projected pixel specified by the projected nodes overlaps with each pixel on the second plane, to thereby calculate an occupancy ratio of the polygon expressing the projected pixel to each pixel on the second plane; and a conversion section distributing X-ray intensity in a pixel on the first plane to a pixel on the second plane based on the occupancy ratio, to thereby convert the X-ray intensity distribution.

In this manner, the X-ray analysis apparatus of the present invention calculates the occupancy ratio of the polygon expressing the projected pixel in each pixel on the second plane by using the intermediate point of the grid points on the first plane as the node, and thus can compute each of the occupancy ratio through the use of the polygon close to a shape of the projected pixel and converts the X-ray intensity distribution highly accurately. Furthermore, there can be reduced a calculation amount in the area calculation for the polygon expressing the projected pixel. Moreover, a spatial resolution can be preserved, and by maintaining a measured physical amount, an intensity value can be converted reversibly as an injection.

(2) Moreover, in the X-ray analysis apparatus of the present invention, the pixel on the first plane is partitioned by straight lines parallel to coordinate axes. Thereby, it is possible to convert the X-ray intensity distribution effectively and to improve precision while reducing a calculation amount. In this case, the pixel on the first plane has a square shape or rectangular shape.

(3) In addition, in the X-ray analysis apparatus of the present invention, each of the projection section, the occupancy ratio calculation section, the table generation section, and the conversion section performs real number computation. Thereby, it is possible to improve the precision of the computation because of nonoccurrence of a rounding error.

(4) Furthermore, in the X-ray analysis apparatus of the present invention, the projection section projects, onto the second plane, points which divide a line between the grid points into 1/n segments at regular intervals (n: integer), as the nodes. Thereby, it is possible to bring a shape of the projected pixel which is expressed by the nodes, close to an actual shape of the projected pixel, and the precision of the calculation is improved.

(5) Moreover, the X-ray analysis apparatus of the present invention further includes: a table generation section generating a table for distributing the X-ray intensity in the pixel on the first plane to the pixel on the second plane based on the occupancy ratio, and the conversion section converts the X-ray intensity from a distribution on the first plane into a distribution on the second plane by using the generated table. By performing the conversion using the table in this manner, it is possible to reduce the calculation amount and perform real-time conversion of the X-ray intensity distribution.

(6) In addition, in the X-ray analysis apparatus of the present invention, the occupancy ratio calculation section calculates the occupancy ratio by parallel processing. Thereby, it is possible to perform the calculation with a smaller number of passes and to improve calculation efficiency, and resultantly to improve real-time capability.

(7) Furthermore, the X-ray analysis apparatus of the present invention performs data correction by the X-ray intensity distribution conversion in which the first plane is defined as an actual detection plane of an X-ray detector and the pixel on the first plane is defined as a pixel of the actual detection plane, and the second plane is defined as an ideal detection plane of the X-ray detector and the pixel on the second plane is defined as a pixel of the ideal detection plane. Thereby, it is possible to correct X-ray detection data even when alignment is not satisfactory. Furthermore, it is possible to set a detector at an optional position for measurement and to utilize corrected data.

(8) Moreover, an X-ray analysis system of the present invention includes: a plurality of detectors arranged in parallel to a scan direction; and the X-ray analysis apparatus according to (7), wherein the X-ray analysis apparatus performs the correction on data obtained by the detectors. Thereby, it is possible to detect X-ray diffraction data at a time without a gonio-meter mechanism and to utilize the corrected data.

(9) In addition, an X-ray analysis system of the present invention includes: a plurality of detectors arranged on a hemisphere face; and the X-ray analysis apparatus according to (7), wherein the X-ray analysis apparatus performs the correction on data obtained by the detectors. Thereby, it is possible to detect X-ray diffraction data at a time without gonio-meter mechanism and to utilize the corrected data.

(10) Furthermore, an X-ray analysis method of the present invention is an X-ray analysis method converting an X-ray intensity distribution of discrete data determined for each pixel, from a first plane where the distribution is known into a second plane where the distribution is not known, and includes the steps of: projecting, onto the second plane, a grid point which specifies a pixel on the first plane and an intermediate point between the grid points, as nodes; calculating an area of a region where a polygon expressing a projected pixel specified by the projected nodes overlaps with each pixel on the second plane, to thereby calculate an occupancy ratio of the polygon expressing the projected pixel to each pixel on the second plane; and distributing X-ray intensity in the pixel on the first plane to the pixel on the second plane based on the occupancy ratio, to thereby convert the X-ray intensity distribution.

Thereby, it is possible to calculate each occupancy ratio by using the polygon close to a shape of the projected pixel and to convert the X-ray intensity distribution highly accurately. Furthermore, it is possible to reduce the calculation amount in the area calculation of the polygon which expresses the projected pixel. Moreover, it is possible to preserve the spatial resolution, and by maintaining the measured physical amount, it is possible to convert the intensity value reversibly as an injection.

(11) Moreover, A computer-readable and non-transitory recording medium recording an X-ray analysis program converting an X-ray intensity distribution of discrete data determined for each pixel, from a first plane where the distribution is known into a second plane where the distribution is not known, wherein the X-ray analysis program causes a computer to execute processing comprising: projecting, onto the second plane, a grid point which specifies a pixel on the first plane and an intermediate point between the grid points, as nodes; calculating an area of a region where a polygon expressing a projected pixel specified by the projected nodes overlaps with each pixel on the second plane, to thereby calculate an occupancy ratio of the polygon expressing the projected pixel to each pixel on the second plane; and distributing X-ray intensity within the pixel on the first plane to the pixel on the second plane based on the occupancy ratio, to thereby convert the X-ray intensity distribution.

Thereby, it is possible to calculate each occupancy ratio by using the polygon close to the shape of the projected pixel and to convert the X-ray intensity distribution highly accurately. Furthermore, it is possible to reduce the calculation amount in the area calculation of the polygon which expresses the projected pixel. Moreover, it is possible to preserve the spatial resolution, and by maintaining the measured physical amount, it is possible to convert the intensity value reversibly as an injection.

According to the present invention, it is possible to calculate each occupancy ratio by using a polygon close to the shape of a projected pixel and to convert the X-ray intensity distribution highly accurately. Furthermore, it is possible to reduce the calculation amount of the area calculation of the polygon expressing the projected pixel. Moreover, it is possible to preserve the spatial resolution, and by maintaining the measured physical amount, it is possible to convert the intensity value reversibly as an injection.

DETAILED DESCRIPTION OF THE INVENTION

Figure 1:
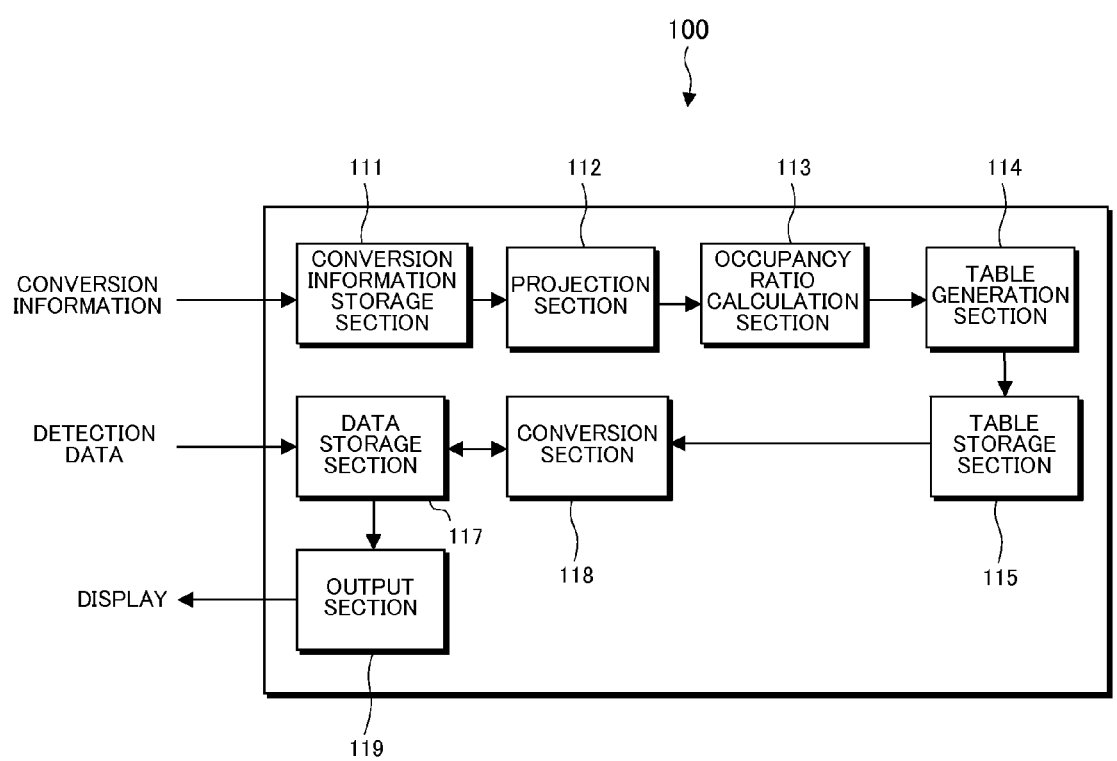
FIG. 1 is a block diagram showing a configuration of an X-ray analysis apparatus according to the present invention.

Next, an embodiment of the present invention will be explained with reference to the drawings. For ease of understanding the explanation, in each of the drawings, the same reference numeral is attached to the same constituent and duplicated explanation is omitted.

(Configuration of the X-Ray Analysis Apparatus)

FIG. 1 is a block diagram showing a configuration of an X-ray analysis apparatus 100. The X-ray analysis apparatus 100 converts an X-ray intensity distribution of discrete data determined for each pixel, from a first plane where the distribution is known into a second plane where the distribution is not known, based on given conversion information such as, for example, a correction value. The pixel is a unit element in a coordinate system of a conversion source or a conversion destination. While a PC can be used as the X-ray analysis apparatus 100, a dedicated machine may also be used. The first plane expresses a plane of the conversion source and the second plane expresses a plane of the conversion destination. As shown in FIG. 1, the X-ray analysis apparatus 100 includes a conversion information storage section 111, a projection section 112, an occupancy ratio calculation section 113, a table generation section 114, a table storage section 115, a data storage section 117, a conversion section 118, and an output section 119.

The conversion information storage section 111 stores conversion information specifying a relation between the first plane and the pixel thereof and the second plane and the pixel thereof. For example, the conversion information includes a value expressing inclination or rotation specifying a arrangement of an actual detection plane and a value specifying a arrangement of an ideal detection plane.

The projection section 112 projects, as nodes, a grid point specifying the pixel on the first plane, and an intermediate point between the grid points. The pixel on the first plane or the second plane is preferably partitioned by straight lines parallel to coordinate axes. Thereby, it is possible to efficiently convert the X-ray intensity distribution of discrete data determined for each pixel, and to improve precision while reducing a calculation amount.

The projection section 112 projects, onto the second plane, not only the pixel rid point but also a point existing between the grid points on a side of the pixel, as the intermediate point. Thereby, it is possible to bring a polygon expressed through the use of the projected node close to an ideal projected pixel, and thus the calculation precision is improved. In particular, the intermediate points are preferably divide a line between the grid points into 1/n segments at regular intervals (n: integer).

The occupancy ratio calculation section 113 calculates an area of a shape where the polygon specified by the projected node is cut out by each side of the pixel on the second plane, to thereby calculate an occupancy ratio of the polygon expressing a projected pixel in each pixel on the second plane. Thereby, it is possible to preserve the spatial resolution, and by maintaining the measured physical amount, it is possible to perform the conversion reversibly as an injection.

The table generation section 114 generates a table for distributing the X-ray intensity in a pixel on the first plane to a pixel on the second plane, based on the occupancy ratio. The table generation is preferably performed by parallel processing, and thus it becomes possible to realize high speed processing. By using the table in this manner, the X-ray intensity conversion becomes easy. Once the table is generated, it becomes possible to reduce the calculation amount required for the conversion and to realize real-time conversion. The table storage section 115 stores the generated table. The data storage section 117 stores measurement data and the subsequent conversion data.

The conversion section 118 distributes the X-ray intensity in a pixel on the first plane to a pixel on the second plane based on the occupancy ratio, to thereby convert the X-ray intensity distribution. The conversion section 118 obtains data to be converted from the data storage section 117 and converts the X-ray intensity from a distribution on the first plane to a distribution on the second plane through the use of the read-out table. The conversion section 118 causes the converted intensity distribution to be stored into the data storage section 117. The output section 119 outputs the data after the conversion to a display screen or the like.

Note that each of the projection section 112, the occupancy ratio calculation section 113, the table generation section 114, and the conversion section 118 performs real number computation. Thereby, it is possible to improve the precision of the computation because of nonoccurrence of a rounding error. Furthermore, by expressing internal data not by an integer but by a real number, it becomes possible to perform boundary processing between small modules, which does not receive influence of the rounding error even in a low dose region. The conversion processing may be performed with one pass by parallel processing. In this case, all the calculation information may be accumulated in a shared memory.

(Operation of the X-Ray Analysis Apparatus)

Figure 2:
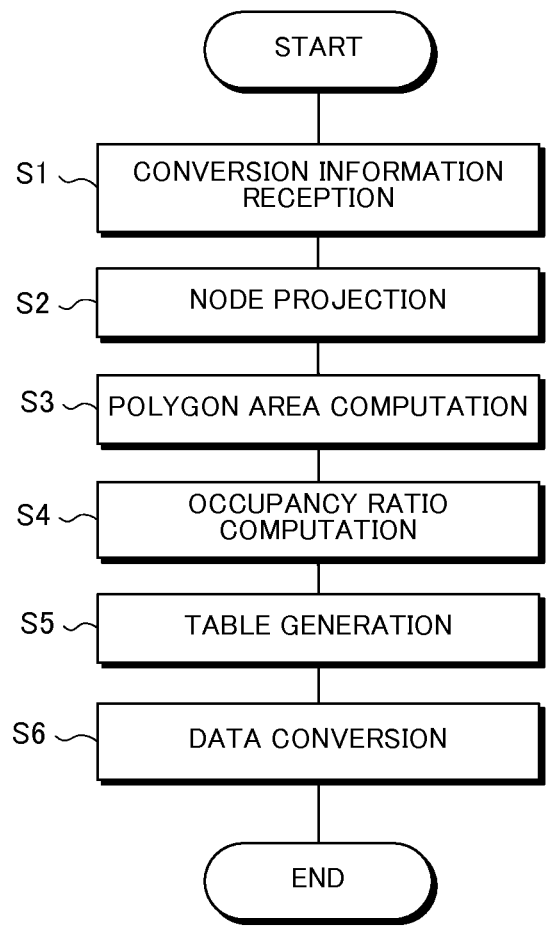
FIG. 2 is a flowchart showing operation of an X-ray analysis apparatus according to the present invention.

There will be explained operation of the X-ray analysis apparatus 100 configured as described above. FIG. 2 is a flowchart showing operation of the X-ray analysis apparatus 100. First, the input of the conversion information such as a correction value is received (step S1). Next, nodes of a pixel on the first plane are projected onto the second plane (step S2). An area i a region, which is specified by cutting out a polygon formed by the projected nodes by each pixel of the second plane, is computed (step S3).

In this manner, an occupancy ratio of the polygon formed by the projected nodes is computed in each pixel of the second plane (step S4). Then, a table expressing the conversion from data on the first plane to data on the second plane is created from the obtained occupancy ratio (step S5) and the table is preserved. Note that a calculation method of the occupancy ratio (overlap calculation method) will be described later. Next, data of the X-ray intensity distribution on the first plane is prepared, the preserved table is read out, the X-ray intensity distribution data is converted into data on the second plane through the use of this table (step S6), and the operation is finished. The above-described operation becomes possible by causing a computer to execute a program.

(Outline of an Overlap Calculation Method)

Figure 3:
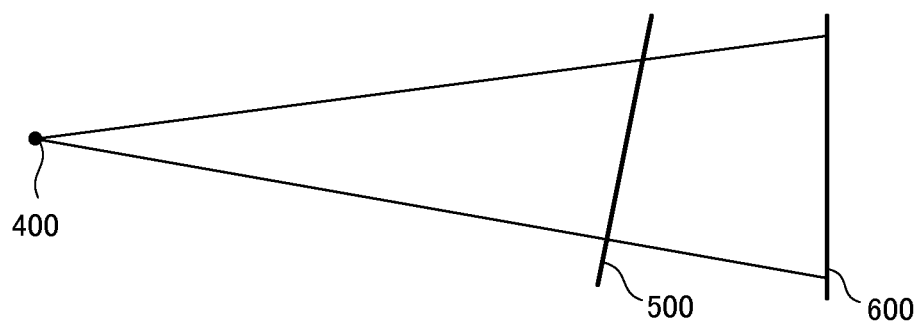
FIG. 3 is a schematic diagram showing a first plane and a second plane.

Next, an outline of an overlap calculation method will be explained as a calculation method of the occupancy ratio. FIG. 3 is a schematic diagram showing the first plane and the second plane. In an example shown in FIG. 3, facing to a sample position 400, there exist a plane 500 where the X-ray intensity distribution is known (first plane) and a plane 600 where the X-ray intensity distribution is not known (second plane).

Figure 4:
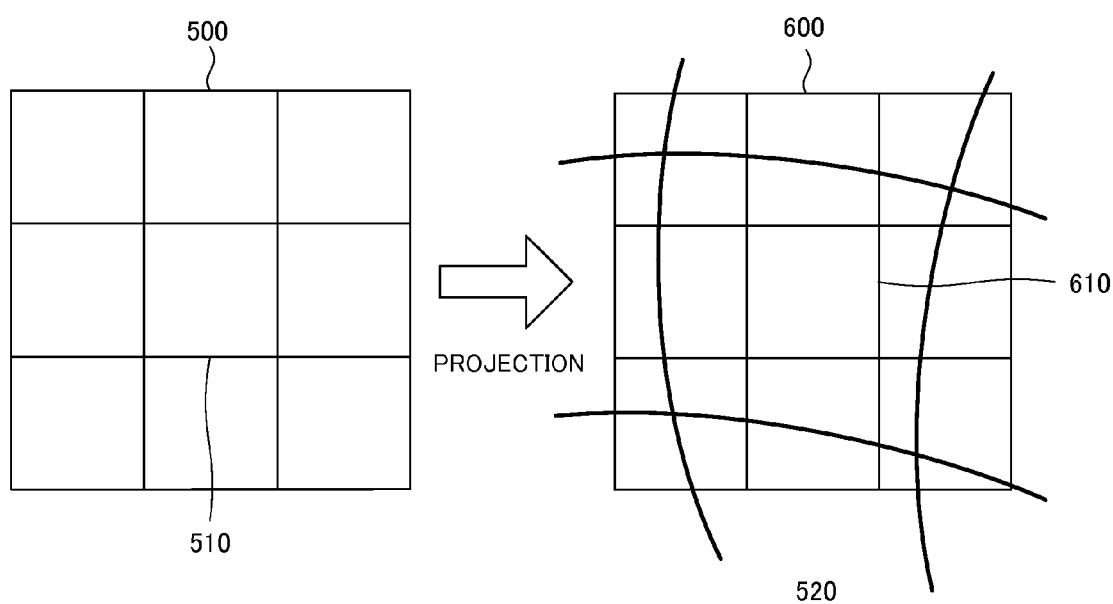
FIG. 4 is a schematic diagram showing pixel projection.

FIG. 4 is a schematic diagram showing pixel projection. As shown in FIG. 4, the plane 500 is partitioned by a square pixel 510 and the plane 600 is partitioned by a square pixel 610. From the sample position 400, the pixel 510 is projected onto the plane 600 and a projected pixel 520 appears as a distorted rectangle.

Figure 5:
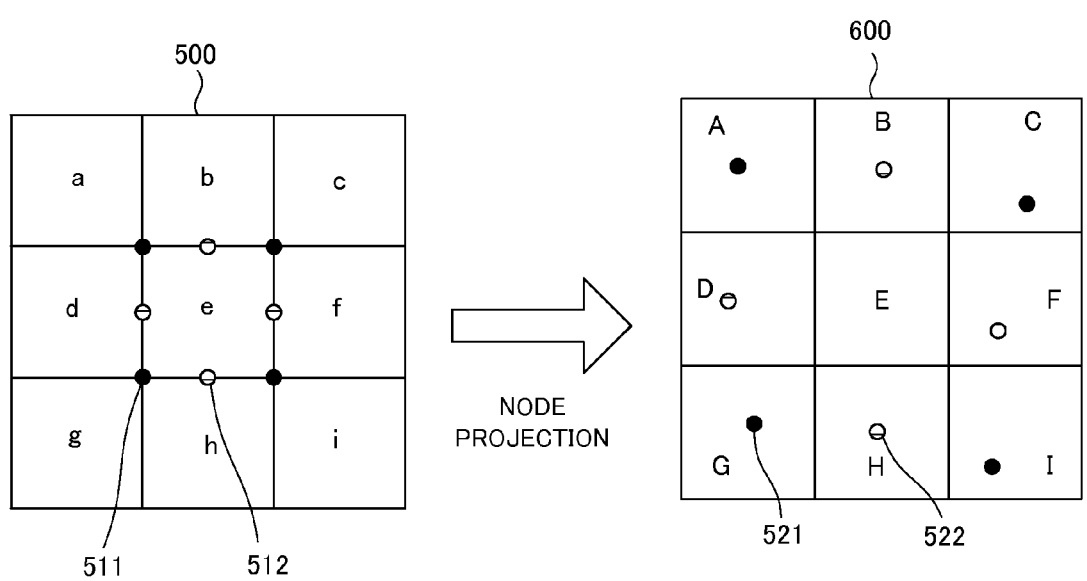
FIG. 5 is a schematic diagram showing node projection.

FIG. 5 is a schematic diagram showing node projection. In the following explanation, the respective pixels of the conversion source are expressed by Qa to Qi and the respective pixels of the conversion destination are expressed by RA to RI. In an example of FIG. 5, a grid point 511 and an intermediate point 512 of pixel Qe on the plane 500 are projected onto the plane 600. The grid point 511 is projected on a projected point 521 and the intermediate point 512 is projected on a projected point 522. In this manner, the node of a pixel can be projected. Note that, in FIG. 5, pixels Qa to Qi on the plane 500 are simply expressed by a to i. Each of a to i corresponds to (iq, jq) to be described later. Furthermore, in FIG. 6, pixels RA to RI on the plane 600 are simply expressed by A to I. Each of A to I corresponds to (ir, jr) to be described later.

Figure 6:
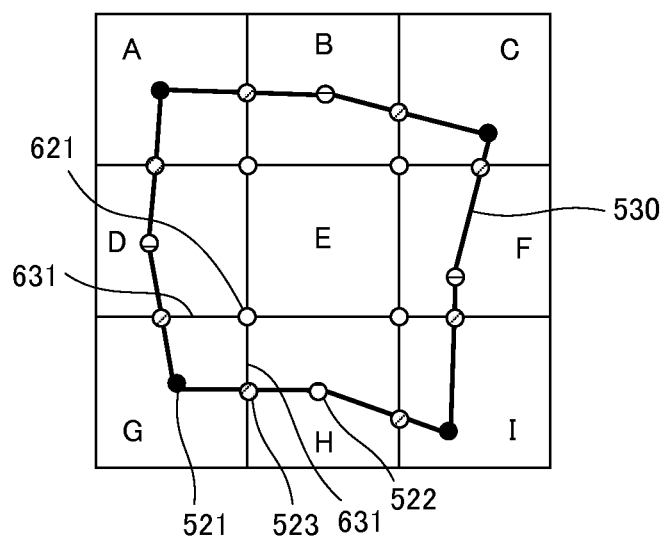
FIG. 6 is a schematic diagram showing a polygon of a projected pixel.

FIG. 6 is a schematic diagram showing a polygon of a projected pixel. A polygon 530 which approximates the projected pixel 520 on the plane 600 is obtained from the projected points 521 and 522 as obtained above. Each side of the polygon 530 crosses a side that divides pixels 610 on the plane 600, and there can also be calculated coordinates of an intersection point 523 and coordinates of a pixel grid point 621 where cross-lines 631 cross each other.

Figure 7:
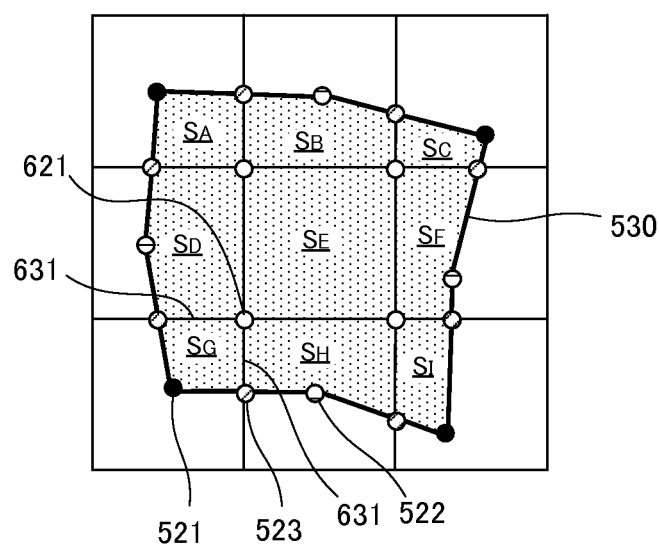
FIG. 7 is a schematic diagram showing a region where a polygon of a projected pixel overlaps with a pixel of projection destination.

FIG. 7 is a schematic diagram showing regions where the polygon of the projected pixel overlaps with pixels of the projection destination. Pixels included in the polygon 530 are further specified here. It becomes possible to calculate areas SA to SI (S (ir, jr) to be described below) of polygons specified by the above obtained coordinates of the projected points 521, 522, and intersection point 523, and the grid points 621. In addition, it is possible to compute an area ratio (occupancy ratio) of the region where the polygon of the projected pixel overlaps with a pixel of the projection destination, to the region of the whole polygon.

Note that, while the pixel is preferably a square pixel for the purpose of simplifying the calculation, the pixel may be formed in a rectangle, a parallelogram, a hexagon, or the like. Furthermore, a pixel value distribution can be converted from a flat plane into a curved plane, and an area can also be computed on the assumption that each pixel is assumed to be at least flat in a curved plane, for calculation.

(Details of the Overlap Calculation Method)

Next, the overlap calculation method used as an algorithm for data conversion, will be explained in detail through the use of coordinates. In this calculation method, there are provided real number coordinates for the converted points of grid points and 1/n division points in a flat plane, and there are calculated all of the apexes of a polygon formed by the conversion of a pixel, the grid points of conversion destination pixels included therein, and the intersection points of the grid. Then, each area of the polygon which overlaps with the conversion destination pixel is obtained. Note that, all the provided real number coordinates are different from one another.

First, each pixel is subjected to coordinate conversion of original image coordinates into converted image coordinates. For example, four apexes of a conversion source pixel Q(iq, jq) are defined respectively as follows (iq, jq: natural number).

Q0: (iq, jq)
Q1: (iq+1, jq)
Q2: (iq+1, jq+1)
Q3: (iq, jq+1)

When pixel Q (iq, jq) is converted into pixel R (ir, jr) (ir, jr: natural number) by conversion G(x, y) at conversion source coordinates (x, y), four apexes on the converted image are expressed as follows.

R0: (iq, jq)+G(iq, jq)
R1: (iq+1, jq)+G(iq+1, jq)
R2: (iq+1, jq+1)+G(iq+1, jq+1)
R3: (iq, jq+1)+G(iq, jq+1)

Furthermore, the conversion of Q0Q1, Q1Q2, Q2Q3, and Q3Q0 including the intermediate points dividing each side of Q0Q1, Q1Q2, Q2Q3, and Q3Q0 (conversion into sub-pixel) is performed. In this manner, by the conversion into sub-pixel and the subsequent calculation, it becomes possible to achieve a higher precision in the calculation and to perform conversion to a smooth image. In contrast, it is possible to keep low the increase in the calculation amount. Note that the division is preferably performed at regular intervals. Moreover, the number of divisions can be determined by the balance with the calculation amount, and the division can be fine on the lower angle side of the diffraction angle and can be coarse on the higher angle side.

Next, in the coordinate system of the conversion destination, there are obtained minimum coordinates Rmin (irmin, jrmin) in which a decimal fraction of each coordinate value for R0 is rounded off, and maximum coordinates Rmax (irmax, jrmax) in which a decimal fraction of each coordinate value of R2 is rounded up. There is a following relationship between the respective coordinates and the apexes in the conversion destination.

Rmin=floor (R0)
Rmax=ceil (R2)

The calculation of an area of one pixel in the conversion destination can be restricted within a region determined by the above-described two coordinates Rmin and Rmax.

Next, the nodes and the intersection points of the polygon which express the converted pixel are extracted. In the case where the number of sub-pixel divisions is assumed to be four and only a ½ point (middle point) is converted, when point Qs on side Q0Q1 is expressed by Qs: (iq+0.5, jq), the point is expressed on the converted image as Rs: (iq+0.5, jq)+G(iq+0.5, jq). An intersection point of line segment R0Rs with the coordinate grid on the converted image is expressed by Rc. Furthermore, a grid point existing within the polygon expressing the projected pixel is expressed by RI.

The intersection point is obtained as follows. First, each side is obtained from apex Ri (i=0, n=1, R0=Rn) which is ordered in a clockwise direction around the polygon which expresses the converted pixel. Then, in a region which has diagonal apexes of Rmin and Rmax and is formed by a group of pixels in the conversion destination, it is determined whether or not each side of pixel R (ir, jr) intersects with each side of the above-described n-gon. At this time, it is determined whether or not line segments which connect (ir, jr) and (ir+1, jr+1) centering around coordinates (ir, jr) which satisfy the following relationship has an intersection point with each side Si of the n-gon.

irmin+1≤ir≤irmax−1
jrmin+1≤jr≤jrmax−1

Then, when the intersection point exists, there is provided information of which region the line segment having the intersection point (cross-line) belongs to. When the intersection point does not exist, the line segment is omitted. Note that, the omitted line segment is a line segment included within the n-gon, for example.

Next, the polygon expressing the converted pixel is divided by the above-described cross-line and the pixel side, and a region where the region surrounded by the above-described polygon overlaps with each pixel on the converted image are extracted (clipping). A polygon formed by the division becomes a region where the polygon expressing the converted pixel overlaps with a conversion destination pixel. Then, sorting of the polygons formed by the division is performed in order of the apexes.

Next, area Sq (ir, jr) of the closed region where the polygon expressing the converted pixel overlaps with a conversion destination pixel is calculated. Area Sq of the overlapped closed region (m-gon) is obtained by the following formula when an apex of the m-gon is expressed by (xk, yk) (k=natural number 1 to m) in order of one-direction rotation.

$$S_q(i_r, j_r) = \frac{1}{2}\sum_{k=1}^{m}(x_k y_{k+1} - x_{k+1} y_k)$$

By such a calculation method, in comparison with conventional methods, it is possible to obtain a result providing a smaller calculation amount than a Monte Carlo calculation and a higher precision than a ready-made triangulation.

Next, in accordance with the obtained area of the closed overlapping region, there is computed Re-distribution of pixel value I(iq, jq) of pixel Q(iq, jq) on the original image, to pixel value I (ir, jr) of conversion destination pixel R(ir, jr). It is possible to perform the computation by the following formula.

$$I(i_r, j_r) = \sum_{i_q, j_q} I(i_q, j_q) \frac{S_q(i_r, j_r)}{\sum_{i_r, j_r}^{q} S_q(i_r, j_r)}$$

(Σ is a total sum for the pixels before the projection, and Σ is a total sum within the polygon expressing the projection of pixel Q)

Thereby, it is possible to convert the pixel values without interpolation from the periphery and to appropriately preserve the spatial resolution of the original image without reducing the initial information amount. Then, the pixel value is accurately preserved locally and globally. By performing this calculation for all Qs (iq, jq), it is possible to obtain a converted image by conversion G(x, y). Different from a photo-processing technique or the like for a digital camera, there are demands for accurate preservation of a pixel value, in a scene of physical amount measurement.

(Real-Time Conversion Using the Table)

Figure 8:
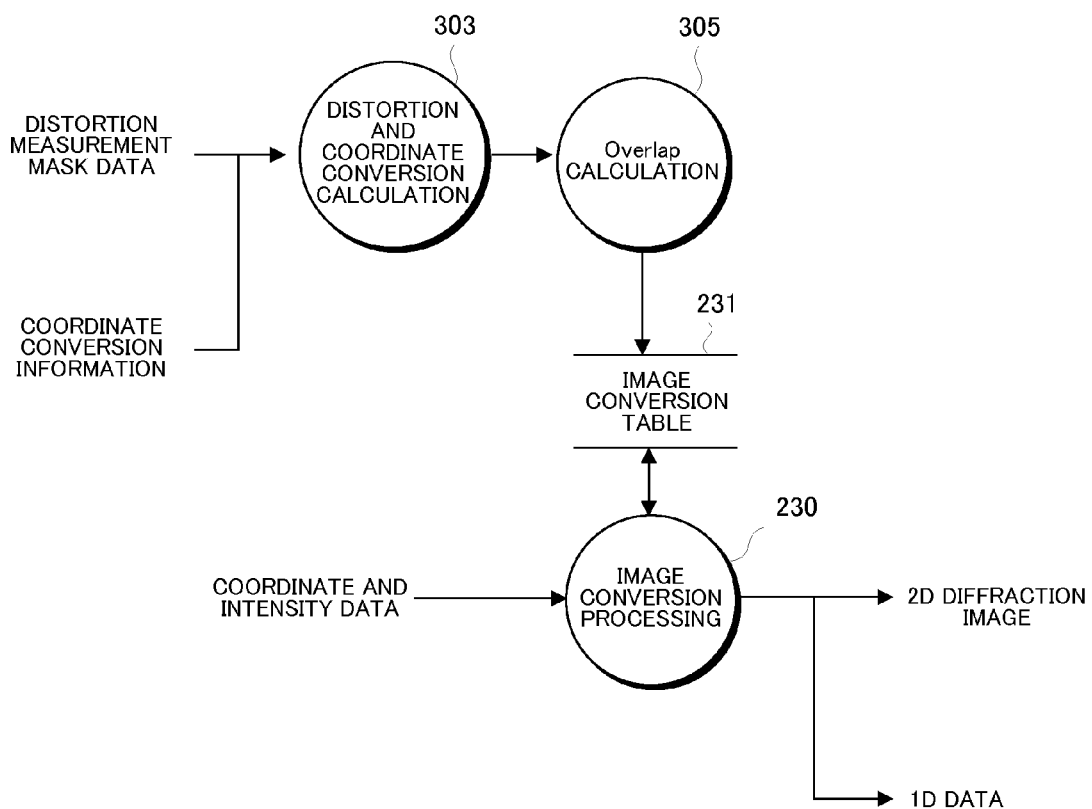
FIG. 8 is a data flowchart showing a series of processing steps.

The image conversion processing can be made more efficient by preparation of a table. FIG. 8 is a data flowchart showing a series of processing. First, distortion and coordinate conversion calculation 303 is executed through the use of distortion measurement mask data prepared preliminarily, and coordinate conversion information obtained by experimental measurement. Then, the overlap calculation 305 is executed based on the coordinate conversion information obtained by the calculation, and the obtained image conversion table 231 is preserved. Note that the mask data indicates detected data of projection of a mask grid at the time of the measurement with a plate-like mask covering a detection plane.

In contrast, scattered X-rays are measured and coordinates and intensity data at the coordinates are obtained. Then, the preserved image conversion table is read out, and image conversion processing 230 is performed on the data obtained using this table. Thereby, it is possible to perform correction of a two-dimensional diffraction image, or perform conversion of the two-dimensional diffraction image into one-dimensional data, in real time at the time of the measurement. Moreover, it is possible to convert the further obtained data into a further different coordinate system by using another image conversion table. By preparing the table in advance, it becomes possible to perform parallel processing and is possible to execute accurate calculation at high speed. In the present invention, high speed processing can be realized not only by features on the logic of using the node, but also by features on the algorithm of using the parallel processing.

Once the table is generated, the conversion therethrough is one-pass processing and the calculation amount can be reduced. Note that, when a measurement configuration is to be changed, the table may be changed in accordance with the configuration. By calculating, at high speed, coordinate conversion (or geometric correction) between discrete data in which integral intensities are preserved, it is possible to perform calculation for combining data sets in an X-ray detector configured with plural modules, calculation for performing conversion among flat plane coordinates, cylindrical coordinates, and spherical coordinates, calculation for projecting flat plane data onto a spherical plane, and the like, with a high degree of precision and at high speed.

(Correction of X-Ray Detection)

Figure 9:
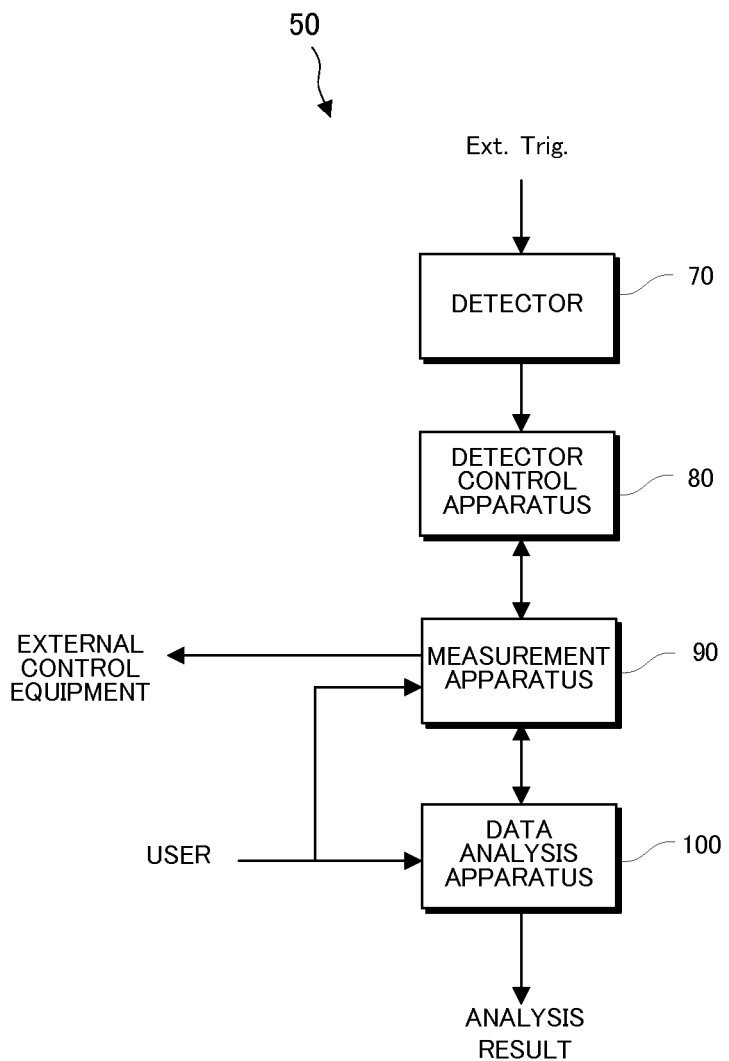
FIG. 9 is a block diagram showing an X-ray analysis system according to the present invention.

FIG. 9 is a block diagram showing an X-ray analysis system 50. As shown in FIG. 9, the X-ray analysis system 50 includes a detector 70, a detector control apparatus 80, a measurement apparatus 90, and a data analysis apparatus 100.

The detector 70 is, for example, a semiconductor detector and functions by an external trigger signal to detect X-ray intensity. The detector control apparatus 80 is an apparatus for controlling the detector 70. The measurement apparatus 90 is operated by a user and controls external control equipment for measurement. The data analysis apparatus 100 substantially configures the X-ray analysis apparatus 100. For each of the apparatuses, while it is sufficient to use a typical PC without preparing a special calculator, if a dedicated machine is used, the processing speed can be further enhanced.

In order to correct detection data appropriately in the X-ray analysis system 50, it is necessary to preliminarily grasp a correction value (kind of conversion information) such as a value of the inclination degree of the detector 70 from an ideal position. For such a correction value, apparatus design is assumed to be predetermined and a value determined at shipping may be used, or a correction value for a configuration adjusted by a user may be used.

The correction values include numerical values expressing distance from a sample, inclination to the sample for the detector 70, and rotation around the detector. Note that, in the case of a lens, aberration and the like of the lens can be grasped by a change depending on whether a projection lens configured with a fine grid (hole) of a plate-like mask exists or not. Furthermore, X-rays are scattered in a cone shape for a normal position and the inclination can be measured by an extent of distortion from a true circle to an ellipsoid, in the projection of an X-ray diffraction image. Note that transfer of data in a certain coordinate system to another coordinate system is referred to as data conversion, and removal of a shift from an ideal value for any physical information is referred to as correction.

While, in the above-described example, alignment is assumed to be performed before the measurement, it is possible to perform the measurement without the alignment. When a portion of a measurement error or an precision error caused by attachment, which cannot be adjusted by a person, is premised on being adjusted by a correction value, and if the correction value is grasped, it is possible to perform appropriate intensity correction even in a state where a user sets the configuration roughly.

Figure 10:
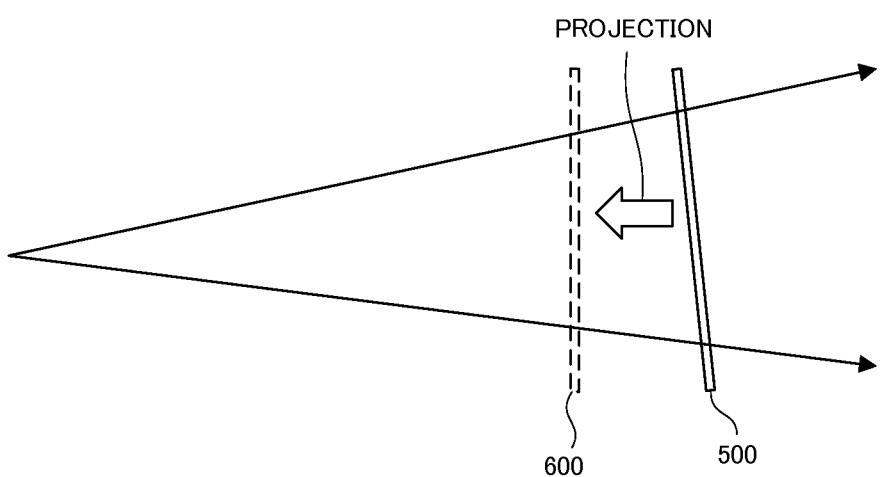
FIG. 10 is a schematic diagram showing detection plane correction.

FIG. 10 is a schematic diagram showing correction of a detection plane. A plane 500 (first plane) is set to be a detection plane of the detector 70 and a plane 600 (second plane) is set to be an ideal detection plane of the X-ray detector. Then, data correction is performed by the above described conversion of the X-ray intensity distribution. Thereby, it is possible to correct the X-ray detection data even when the alignment is not performed sufficiently. Furthermore, it is possible to perform the measurement by a detector being set at an optional position and to utilize the corrected data.

(Position Correction Between the Modules)

Figure 11:
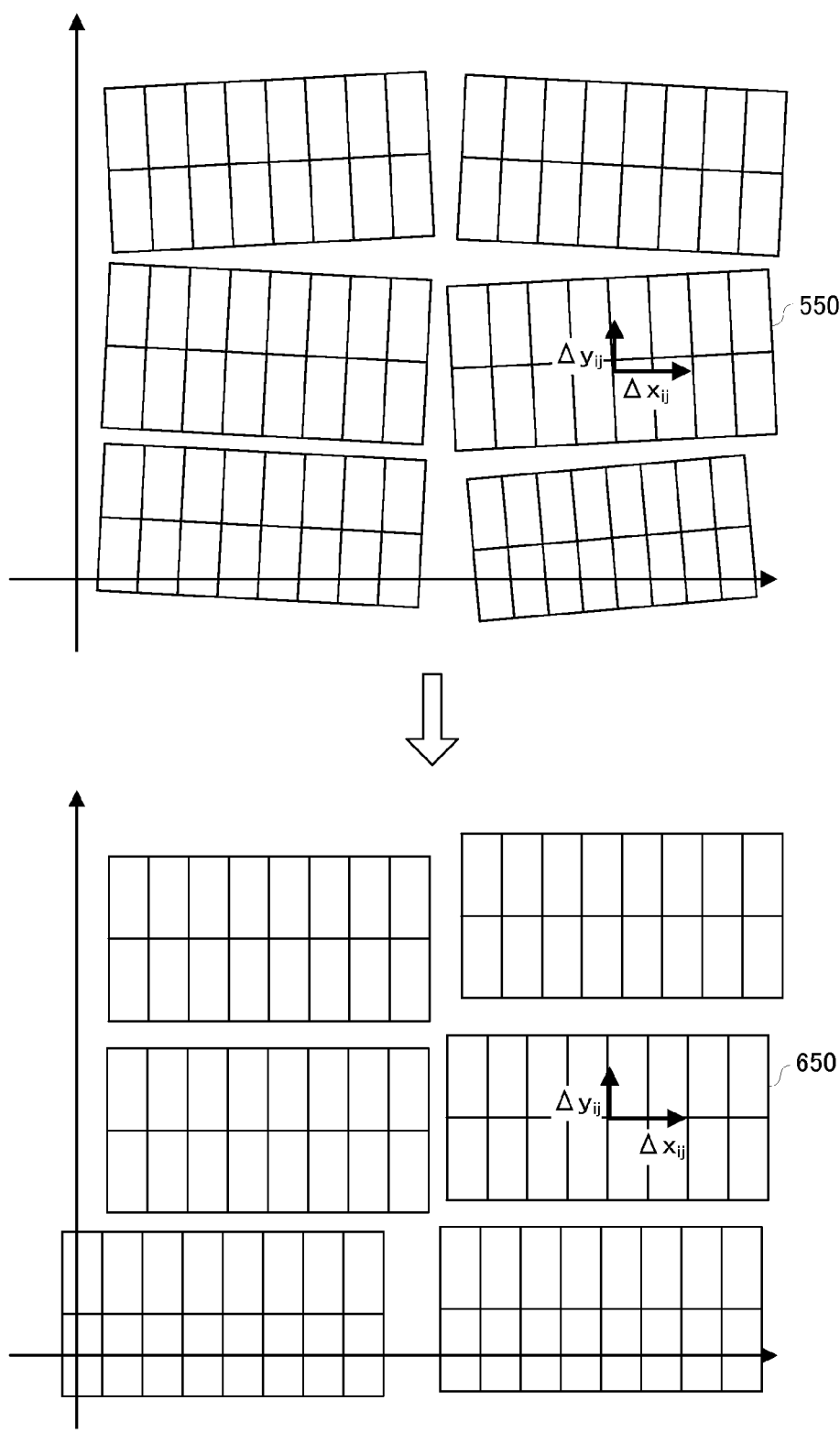
FIG. 11 is a diagram showing correction of data obtained by modules.

It is possible to use the above-described correction processing, for position correction between the modules. FIG. 11 is a diagram showing correction for data obtained by the modules. When the detector is formed by plural modules, although each of the modules is disposed so as to have a predetermined arrangement, actual modules 550 have piecemeal positional errors. For example, in an example of FIG. 11, the longer direction and the shorter direction of the module 550 are rotated from vectors $\Delta x_{ij}$ and $\Delta y_{ij}$ which are to coincide with each other. In the case of this rotation angle, by grasping, in advance, the position of the actual module 550 with respect to the position of an ideal module 650, it is possible to correct data detected at an actual position to data to be detected at an ideal position, by the above-described conversion processing of the measurement data.

Figure 12:
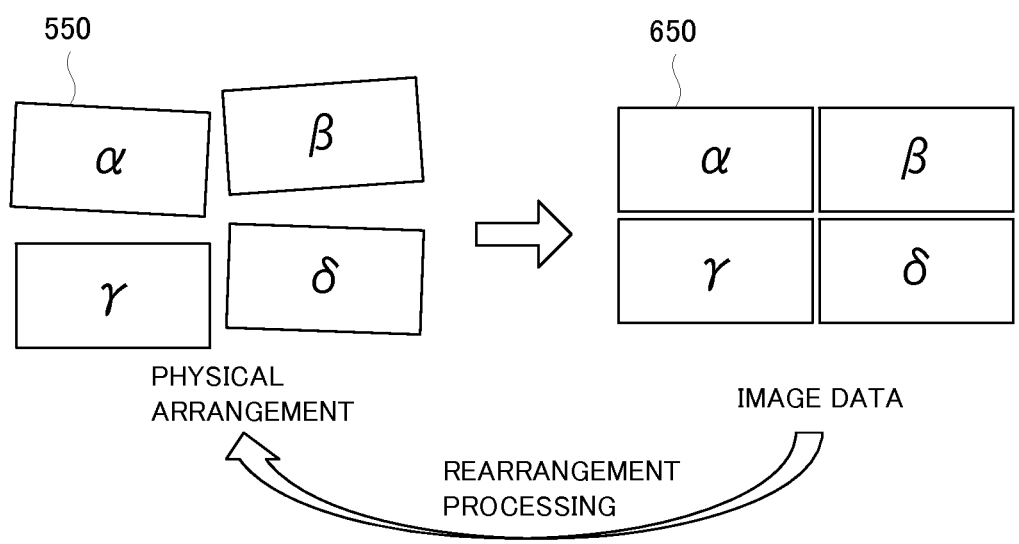
FIG. 12 is a schematic diagram showing rearrangement of modules.

Furthermore, it is also possible to rearrange the modules by using the X-ray scattering data. FIG. 12 is a schematic diagram showing rearrangement of modules 550 (a to δ). It is possible to grasp a shift from an arrangement serving as an ideal X-ray intensity distribution, by using measurement data obtained by a known X-ray optical system, and to rearrange the modules for a physical arrangement. In this manner, it is possible to perform an efficient and highly accurate rearrangement for a detector having a multi-module configuration.

(From a Flat Plane to a Cylindrical Plane or a Spherical Plane, and the Reverse Thereof)

Figure 13:
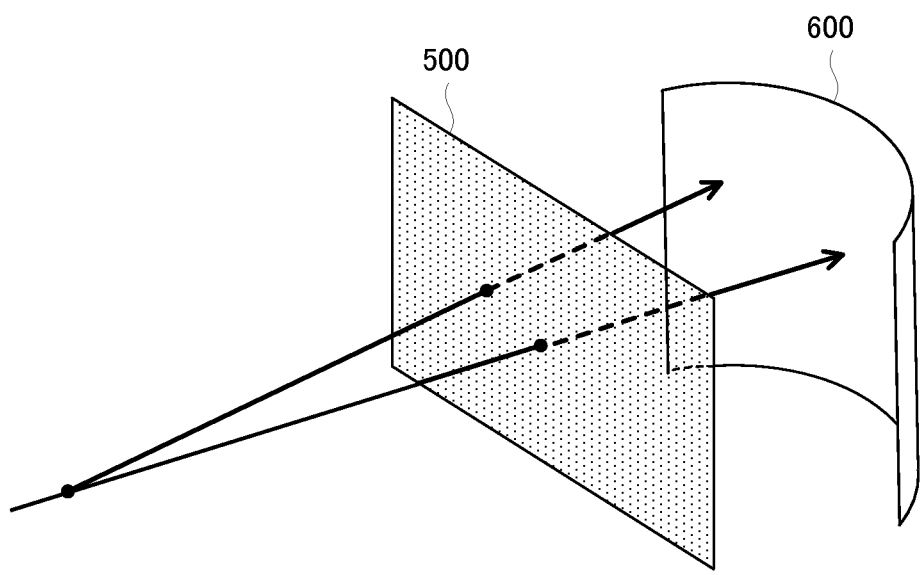
FIG. 13 is a diagram showing conversion of data on a flat plane into data on a cylindrical plane.

While it is possible to apply the conversion processing of the pixel value to the correction of the measurement data as described above, it is possible to convert data further obtained by the correction, between different planes as necessary. FIG. 13 is a diagram showing conversion of data on a flat plane 500 into data on a cylindrical plane 600. Moreover, it is also possible to convert the data on the cylindrical plane into data on a spherical plane. Note that, even when conversion of data is treated on a curved plane, it is possible to apply the above-described overlap calculation method if each pixel is approximated to have a flat plane for calculation.

(Two-Dimensional Data to One-Dimensional Data)

Figure 14:
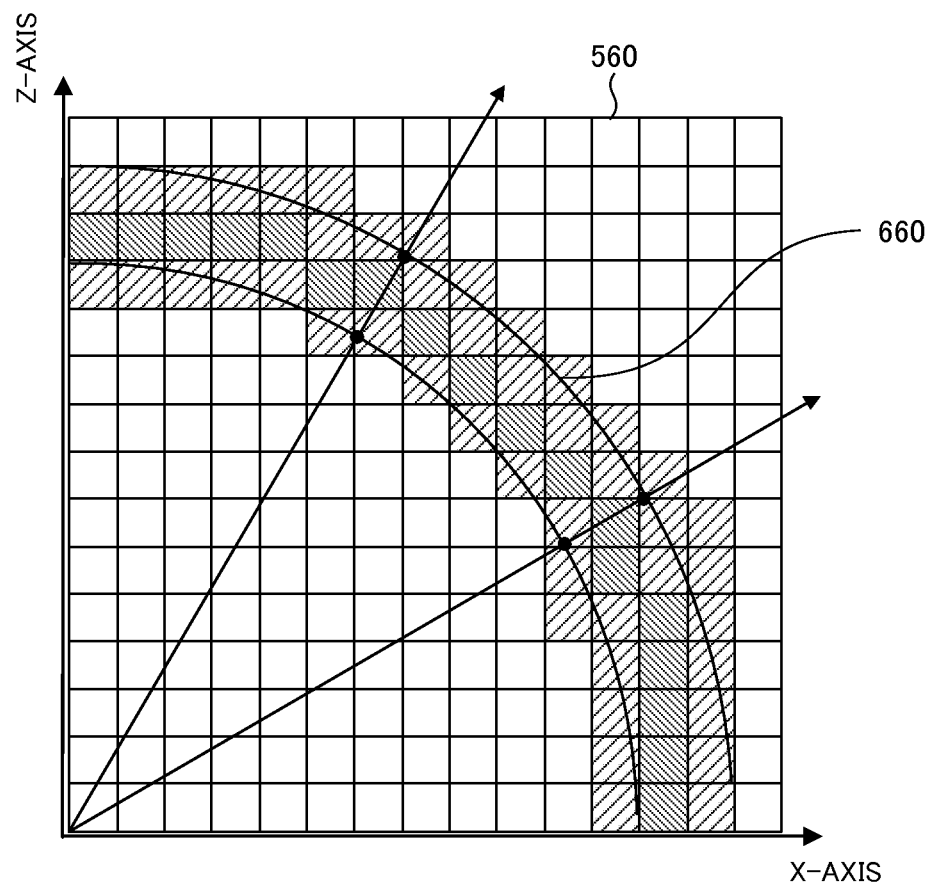
FIG. 14 is a diagram showing conversion of two-dimensional data into one-dimensional data.
Figure 15:
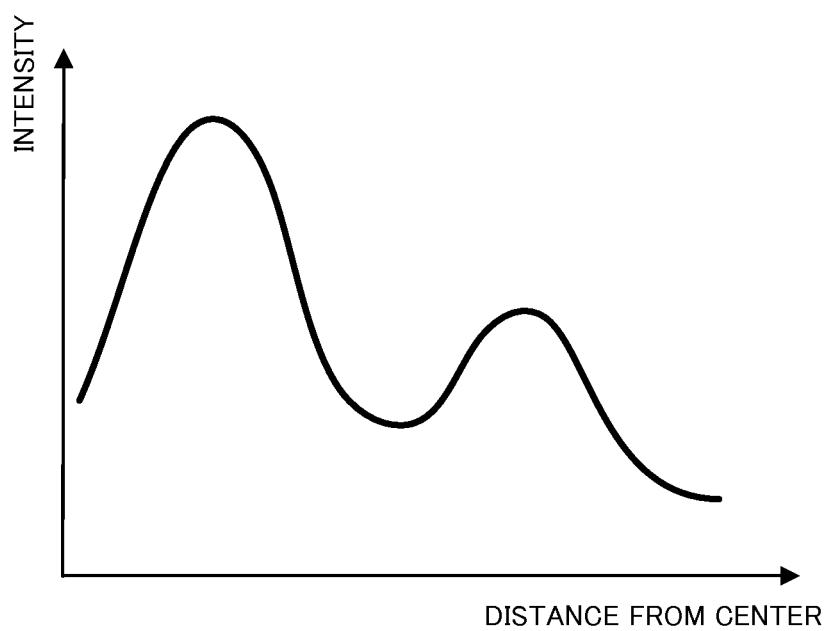
FIG. 15 is a diagram showing converted one-dimensional data.

As described above, it is possible to perform not only the conversion of data between different flat planes, but also the conversion of two-dimensional data into one-dimensional data. FIG. 14 is a diagram showing conversion of two-dimensional data into one-dimensional data. As in the case of conversion of two-dimensional data into one-dimensional data by a circular average processing shown in FIG. 14, it is possible to perform conversion processing without losing spatial resolution even when an observation coordinate system is inclined to a coordinate system of incident and scattered X-rays. In this case, it is possible to perform the conversion into one-dimensional data by converting pixel values of pixels 560 on a two-dimensional plane into pixel values in a predetermined circular region 660. FIG. 15 is a diagram showing converted one-dimensional data.

(Arrangement Example of a Plurality of Detectors)

Measurement of Debye rings and the like may be performed by a configuration of arranging a plurality of detectors in parallel to a scan direction, and correction may be performed on data obtained by the detectors. Thereby, it is possible to detect X-ray diffraction data at a time without a gonio-meter mechanism and to utilize the corrected data. In this manner, it is possible to perform measurement with a scanning-free arrangement as the measurement optical system and to use the data obtained by performing the correction. Note that it is also possible to perform measurement by arranging the plurality of detectors in a direction perpendicular to the scanning direction. Furthermore, measurement may be performed by the plurality of detectors arranged on a hemisphere face.

What is claimed is:

1. An X-ray analysis apparatus converting an X-ray intensity distribution of discrete data determined for each pixel, from a first plane where the distribution is known into a second plane where the distribution is not known, the analysis apparatus comprising:
   a projection section projecting, onto the second plane, a grid point which specifies a pixel on the first plane and an intermediate point between the grid points, as nodes;
   an occupancy ratio calculation section calculating an area of a region where a polygon expressing a projected pixel specified by the projected nodes overlaps with each pixel on the second plane, to thereby calculate an occupancy ratio of the polygon expressing the projected pixel to each pixel on the second plane; and
   a conversion section distributing X-ray intensity in a pixel on the first plane to a pixel on the second plane based on the occupancy ratio, to thereby convert the X-ray intensity distribution.

2. The X-ray analysis apparatus according to claim 1, wherein
   the pixel on the first plane is partitioned by straight lines parallel to coordinate axes.

3. The X-ray analysis apparatus according to claim 1,
   each of the projection section, the occupancy ratio calculation section, table generation section, and the conversion section performs real number computation.

4. The X-ray analysis apparatus according to claim 1, wherein
   the projection section projects, onto the second plane, points which divide a line between the grid points into 1/n segments at regular intervals (n: integer), as the nodes.

5. The X-ray analysis apparatus according to claim 1, further comprising:
   a table generation section generating a table for distributing the X-ray intensity in the pixel on the first plane to the pixel on the second plane based on the occupancy ratio, wherein
   the conversion section converts the X-ray intensity from a distribution on the first plane into a distribution on the second plane by using the generated table.

6. The X-ray analysis apparatus according to claim 1, wherein
   the occupancy ratio calculation section calculates the occupancy ratio by parallel processing.

7. The X-ray analysis apparatus according to claim 1, wherein
   data correction is performed by the X-ray intensity distribution conversion in which the first plane is defined as an actual detection plane of an X-ray detector and the pixel on the first plane is defined as a pixel of the actual detection plane, and the second plane is defined as an ideal detection plane of the X-ray detector and the pixel on the second plane is defined as a pixel of the ideal detection plane.

8. An X-ray analysis system, comprising:
a plurality of detectors arranged in parallel to a scan direction; and
the X-ray analysis apparatus according to claim 7, wherein the X-ray analysis apparatus performs the correction on data obtained by the detectors.

9. An X-ray analysis system, comprising:
a plurality of detectors arranged on a hemisphere face; and
the X-ray analysis apparatus according to claim 7, wherein the X-ray analysis apparatus performs the correction on data obtained by the detectors.

10. An X-ray analysis method converting an X-ray intensity distribution of discrete data determined for each pixel, from a first plane where the distribution is known into a second plane where the distribution is not known, the method comprising the steps of:
projecting, onto the second plane, a grid point which specifies a pixel on the first plane and an intermediate point between the grid points, as nodes;
calculating an area of a region where a polygon expressing a projected pixel specified by the projected nodes overlaps with each pixel on the second plane, to thereby calculate an occupancy ratio of the polygon expressing the projected pixel to each pixel on the second plane; and
distributing X-ray intensity in the pixel on the first plane to the pixel on the second plane based on the occupancy ratio, to thereby convert the X-ray intensity distribution.

11. A computer-readable and non-transitory recording medium recording an X-ray analysis program converting an X-ray intensity distribution of discrete data determined for each pixel, from a first plane where the distribution is known into a second plane where the distribution is not known, wherein the X-ray analysis program causes a computer to execute processing comprising:
projecting, onto the second plane, a grid point which specifies a pixel on the first plane and an intermediate point between the grid points, as nodes;
calculating an area of a region where a polygon expressing a projected pixel specified by the projected nodes overlaps with each pixel on the second plane, to thereby calculate an occupancy ratio of the polygon expressing the projected pixel to each pixel on the second plane; and
distributing X-ray intensity within the pixel on the first plane to the pixel on the second plane based on the occupancy ratio, to thereby convert the X-ray intensity distribution.

* * * * *